A. M. CHENEY.
ANTIFRICTION BEARING.
APPLICATION FILED MAR. 1, 1917.
1,287,225.
Patented Dec. 10, 1918.
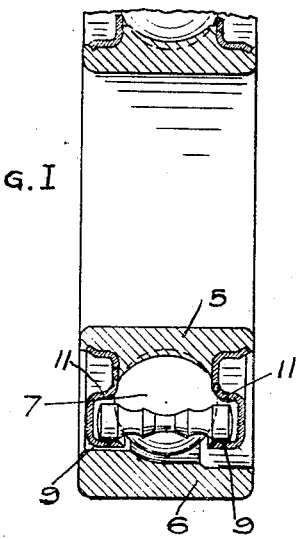
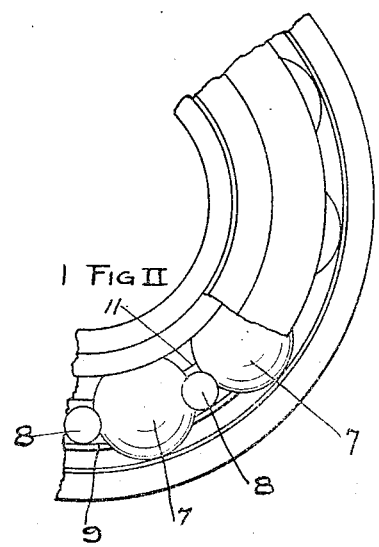
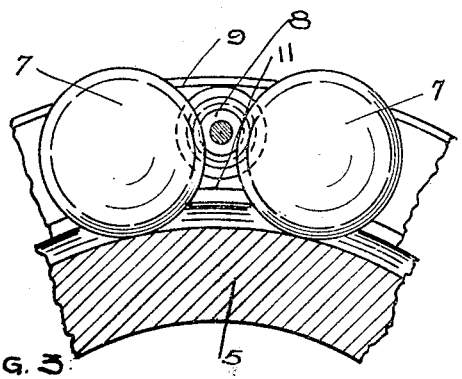
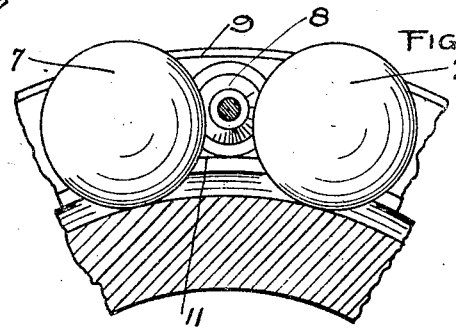
INVENTOR
ARTHUR M. CHENEY
BY
ATTORNEYS

UNITED STATES PATENT OFFICE.

ARTHUR M. CHENEY, OF BROOKLYN, NEW YORK, ASSIGNOR, BY MESNE ASSIGNMENTS, TO MARLIN-ROCKWELL CORPORATION, OF NEW HAVEN, CONNECTICUT, A CORPORATION OF NEW YORK.

ANTIFRICTION-BEARING.

1,287,225.  Specification of Letters Patent.  Patented Dec. 10, 1918.

Application filed March 1, 1917. Serial No. 151,695.

*To all whom it may concern:*

Be it known that I, ARTHUR M. CHENEY, a citizen of the United States of America, and a resident of the city of Brooklyn, in the county of Kings and State of New York, have invented certain new and useful Improvements in Antifriction-Bearings, of which the following is a specification.

This invention relates to anti-friction bearings in which the rolling bearing members are separated by rolling separating members which run on tracks, the parts being so proportioned that only rolling friction is occasioned by the operation of the bearing.

Within this class of bearings it is frequently desirable to locate the separating members well in between the bearing members and to construct the bearing so that the outer runway may be removed for purposes of embodying the bearing in its permanent mounting or for dismantling said mounting while at the same time maintaining the inner raceways, rolling bearing members, rolling separating members, and their tracks in a unit. To meet these conditions it may occur that when the outer raceway is removed from the rest of the bearing the looseness of the bearing members and the separating members is such that one or more of the separating members will drop between the bearing members so far that when reassembling is attempted the separating members may either be found inside a straight line joining the axes of rotation of adjacent bearing members or may bind between the bearing members preventing its resuming its normal position outside of the said line and in contact with the tracks.

This invention aims at the production of a bearing which will eliminate these difficulties.

As a means of illustrating this invention I have shown a radial bearing of an open type provided with bearing members in the form of balls and separating members in the form of rollers but a bearing so constructed is merely chosen for clearness of presentation and it is to be understood that my invention is by no means confined thereto.

In these drawings—

Figure 1 is a partial vertical cross-section of the form of my invention chosen for illustration;

Fig. 2 is a partial side elevation of the embodiment of Fig. 1 with the track on one side of the bearing partially broken away;

Fig. 3 is a detail of the said bearing, with the outer race removed, partially in section and illustrating the normal relations of separating members, bearing members, tracks and inner raceway; and Fig. 4 is a similar detail to Fig. 3 but illustrating the lowermost position of the separating roller as provided for by my invention.

The bearing herein illustrated comprises an inner race 5 and an outer race 6, with balls 7 7 running therebetween and separated by rollers 8 8 which normally run on tracks 9 9 suitably mounted on the inner race, the proportioning of all the parts being such that only rolling friction occurs on the operation of the bearing.

The tracks are extended toward one another so that the distance between them is less than the diameter of the balls, thereby preventing the balls from dropping out between the tracks when the outer race is removed.

Suitable means in the form of annular flanges 11 11 are provided to prevent any of the rollers from assuming such a position between two adjacent balls that its axis of rotation lies to the inside of a straight line joining the axes of rotation of the said adjacent balls. In the form illustrated these flanges are formed on the supporting members for the tracks. It is obvious that this is a matter of convenience in construction and not a necessity thereof. It is desirable that these annular flanges be located as near the separating rollers as proper clearance conditions permit, care being taken that in the normal operation of the bearing the rollers will not come in contact with the flanges.

Referring to Figs. 3 and 4, it should be readily understood that when the outer race is placed upon the inner unit, the balls, as shown in Fig. 4, will be forced toward one another and will lift the roller from the annular flange into normal position in contact with the track as illustrated in Fig. 3.

The foregoing detailed description has been given for clearness of understanding and no undue limitation should be deduced therefrom, but the appended claims should be construed as broadly as permissible in view of the prior art.

What I claim as new and desire to secure by Letters Patent is:

1. In an anti-friction bearing, the combination of relatively movable runways, rolling bearing members, rolling separating members, tracks for the separating members and an annular stop to prevent the separating members from assuming such a position between the bearing members that the axes of rotation thereof lie to the inside of straight lines joining the axes of rotation of adjacent bearing members, substantially as described.

2. In an anti-friction bearing, the combination of relatively movable runways, rolling bearing members, rolling separating members, tracks for the separating members provided with an annular stop to prevent the separating members from assuming such a position between the bearing members that the axes of rotation thereof lie to the inside of straight lines joining the axes of rotation of adjacent bearing members, substantially as described.

3. In an anti-friction bearing, the combination of relatively movable runways, rolling bearing members, rolling separating members, tracks for the separating members and means whereby one of the runways, the bearing members, separating members and the tracks are maintained in a unit independent of the other runway, substantially as described.

4. In an anti-friction bearing, the combination of relatively movable runways, rolling bearing members, rolling separating members and tracks for the separating members, said tracks being provided with annular extensions whereby one of the runways, the bearing members, separating members and the tracks are maintained in a unit independent of the other runway, substantially as described.

5. In an anti-friction bearing, the combination of relatively movable runways, rolling bearing members, rolling separating members, tracks for the separating members provided with annular extensions whereby one of the runways, the bearing members, separating members and the tracks are maintained in a unit independent of the other runway, and said tracks also provided with annular stops to prevent the separating members from assuming such a position between the bearing members that the axes of rotation thereof lie to the inside of straight lines joining the axes of rotation of adjacent bearing members, substantially as described.

6. In an anti-friction bearing, the combination of an inner runway, rolling bearing members, a removable integral outer runway, rolling separating members, tracks for the separating members mounted upon the inner runway, and an annular stop to prevent the separating members from assuming such a position between the bearing members that the axes of rotation thereof lie to the inside of straight lines joining the axes of rotation of adjacent bearing members, substantially as described.

Signed at New York, in the county and State of New York, this 28th day of Febry., 1917.

ARTHUR M. CHENEY.